United States Patent
Brand et al.

(10) Patent No.: US 10,108,670 B2
(45) Date of Patent: Oct. 23, 2018

(54) PARALLEL QUICKSORT

(71) Applicant: INTERNATIONAL BUSINESS MACHINES CORPORATION, Armonk, NY (US)

(72) Inventors: Daniel Brand, Millwood, NY (US); Minsik Cho, Austin, TX (US); Ruchir Puri, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 14/830,387

(22) Filed: Aug. 19, 2015

(65) Prior Publication Data

US 2017/0053000 A1 Feb. 23, 2017

(51) Int. Cl.
G06F 17/30 (2006.01)

(52) U.S. Cl.
CPC .... G06F 17/30486 (2013.01); G06F 17/3051 (2013.01); G06F 17/30982 (2013.01)

(58) Field of Classification Search
CPC .... G06F 17/18; G06F 17/30489; G06F 8/423; G06F 8/45
USPC ......................................................... 707/752
See application file for complete search history.

(56) References Cited

U.S. PATENT DOCUMENTS

| | | | |
|---|---|---|---|
| 5,768,594 A | 6/1998 | Blelloch et al. | |
| 6,106,575 A * | 8/2000 | Hardwick | G06F 8/45 712/229 |
| 7,899,796 B1 * | 3/2011 | Borthwick | G06F 17/30489 707/692 |
| 2009/0125882 A1 | 5/2009 | Frigo et al. | |
| 2009/0167763 A1 * | 7/2009 | Waechter | G06T 15/06 345/426 |
| 2016/0253671 A1 * | 9/2016 | Blainey | G06F 17/18 705/35 |
| 2016/0350308 A1 * | 12/2016 | Marcotte | G06F 17/30489 |

OTHER PUBLICATIONS

Ryza et al., "Improving Sort Performance in Apache Spark: It's a Double," Cloudera Engineering Blog, Cloudera, Inc., Jan. 14, 2015, pp. 1-6, http:l/blog.cloudera.com/blog/2015/01/improving-sort-performance-in-apache-spark-its-a-double/.

* cited by examiner

Primary Examiner — Hanh B Thai
(74) Attorney, Agent, or Firm — Tutunjian & Bitetto, P.C.; Rabin Bhattacharya

(57) ABSTRACT

Methods and systems for sorting a dataset include partitioning the dataset into $2n$ partitions, where n is a number of available processors. A first quicksort is performed in parallel across pairs of partitions based on a pivot using a plurality of processors. A second quicksort is performed in parallel on unsorted elements within each partition based on the pivot, where the unsorted elements were left unsorted by the first quicksort. Misplaced elements from a left side of the dataset are swapped with misplaced elements from a right side of the dataset to produce a left dataset that has elements equal to or lower than the pivot and a right dataset that has elements equal to or higher than the pivot.

20 Claims, 4 Drawing Sheets

US 10,108,670 B2

PARALLEL QUICKSORT

BACKGROUND

Technical Field

The present invention relates to sorting data and, more particularly, to parallelizing a quicksort.

Description of the Related Art

Sorting a dataset is an important function of computing systems that is performed in nearly every field of computing. Sorting is of particular importance in the field of database management, where large datasets are sorted according to the needs of a user or of an application.

As parallel computing solutions become more prevalent, and in particular as distributed computing solutions such as clouds take a prominent role, in many ways the parallel computing solutions are limited by their sorting ability. For example, cloud computing efforts can perform large computations in relatively little time, but sorting is still an important part of their process. For example, aggregation steps in parallel computing assemble the data from multiple parallel processes and make use of sorting. However, sorting is a difficult problem for parallel computing. While quicksort is known to be particularly fast for general sorting of data, it is very difficult to parallelize.

Quicksort employs a "pivot," which is one element from the data set to be sorted. The pivot is assumed to be the median of the set and individual elements are swapped, starting from the ends of the data set and working inward, if they are on the wrong sides of the pivot. The pivot will not, in the general case be the actual median of the set, but by performing one pass of the quicksort, the resulting set has everything lower than the pivot to the left of the pivot and everything higher than the pivot to the right of the pivot. The quicksort process is then recursively repeated for each of those two sets—lower and higher—with a new pivot being selected for each. In this manner, the set is eventually sorted.

Quicksort is challenging to parallelize. Because the true median is not known at first, it is difficult to split the sort without resorting to locks to share information between threads.

SUMMARY

A method for sorting a dataset includes partitioning the dataset into 2n partitions, where n is a number of available processors. A first quicksort is performed in parallel across pairs of partitions based on a pivot using a plurality of processors. A second quicksort is performed in parallel on unsorted elements within each partition based on the pivot, where the unsorted elements were left unsorted by the first quicksort. Misplaced elements from a left side of the dataset are swapped with misplaced elements from a right side of the dataset to produce a left dataset that has elements equal to or lower than the pivot and a right dataset that has elements equal to or higher than the pivot.

A parallel sort system includes multiple hardware processors, each configured to perform a first quicksort on a respective pair of partitions, to perform a second quicksort within one of the respective pair of partitions, and to swap misplaced elements between a left and a right side. A memory stores a dataset. A sort control module is configured to partition the dataset into 2n partitions, where n is a number of available processors, to trigger a first quicksort in parallel across pairs of partitions based on a pivot, to trigger a second quicksort in parallel on unsorted elements within each partition based on the pivot, where the unsorted elements were left unsorted by the first quicksort, and to trigger a swap of misplaced elements from a left side of the dataset with misplaced elements from a right side of the dataset to produce a left dataset that has elements equal to or lower than the pivot and a right dataset that has elements equal to or higher than the pivot.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention implement a quicksort in parallel. It is anticipated that the selected pivot will not be the median, which will produce incorrect results as most threads will be unable to completely sort their partitions of the dataset in an in-place fashion. However, repairing the resulting incorrectly sorted partitions can also be performed in parallel, such that the process as a whole can be accelerated significantly over traditional quicksort.

Figure 1:
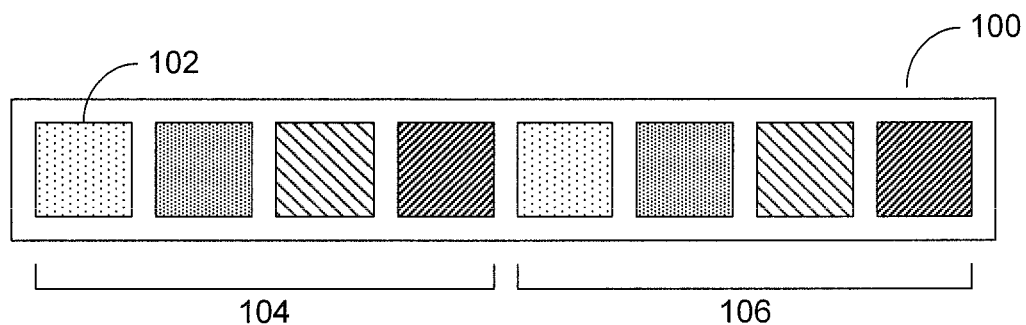
FIG. 1 is a diagram of a set of unsorted partitions in accordance with the present principles.

Referring now to FIG. 1, an initial dataset 100 is divided into 2n partitions 102, where n is the number of parallel threads (usually the number of processors or processor cores, though the present principles would apply equally to any number of threads). The partitions 102 are paired, with one being on the left hand side 104 and one being on the right hand side 106 of the dataset 100. A pivot is selected by any appropriate means—it is contemplated that the pivot will most likely not be the true median of the dataset 100. It should be recognized that dividing into left- and right-hand sides is arbitrary—this representation is selected for ease of illustration alone. "Left" and "right" are considered equivalent herein to "lower than the pivot" and "higher than the pivot."

Quicksort is performed on each pair of partitions 102 using the pivot in parallel. Elements from each partition 102 on the left side 104 are swapped with elements from the corresponding partition 102 on the right side 106, with elements on the left side 104 that are larger than the pivot being swapped with elements on the right side 106 that are smaller than the pivot. Because the pivot is probably not the true median AND the distribution of data likely won't be symmetric, this will result in some elements on one side or the other not being sorted.

Figure 2:
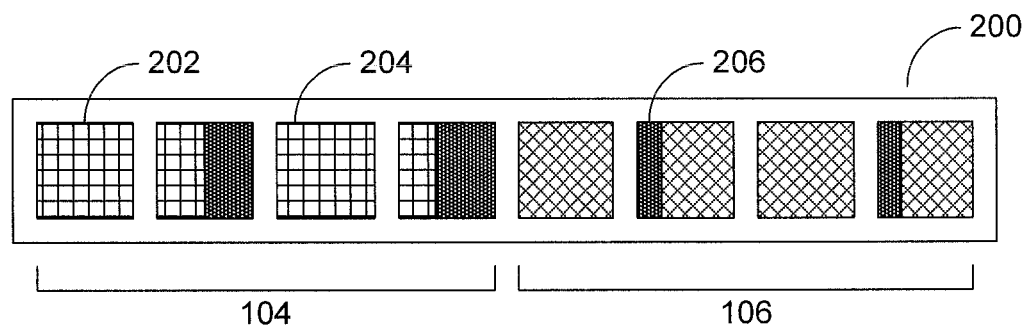
FIG. 2 is a diagram of a set of partially sorted partitions in accordance with the present principles.

Referring now to FIG. 2, the partially sorted dataset 200 is shown having the partially sorted partitions 202. In each pair, unless the pivot selected happened to be the precise median of the data in the pair, at least one of the partitions 202 will be completely sorted, shown as regions 204, while the other will have some elements that were never considered, shown as regions 206. This is because there will be an imbalance in most cases between the number elements that belong on the left side 104 and elements that belong on the right side 106. As such, one partition of the pair will have fewer elements that need to swap than the other, such that it runs out of elements first, thereby leaving the unconsidered region 206. Note that this is the direct result of having selected a pivot which is not the true median, and can occur even if the true median of the entire array is selected.

Figure 3:
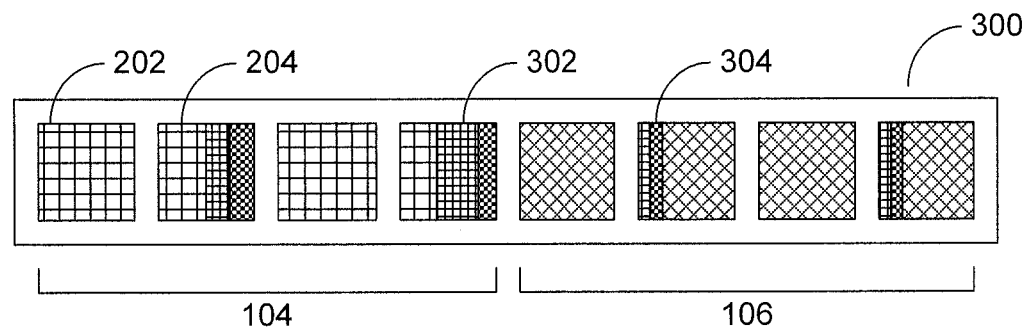
FIG. 3 is a diagram of a set of sorted partitions with misplaced elements in accordance with the present principles.

Referring now to FIG. 3, the unsorted data 206 is sorted in parallel according to the pivot. For each portion of unsorted data 206, there is a sorted portion 302 that belongs on the left side 104 of the pivot and a sorted portion 304 that belongs on the right side 106 of the pivot. It should be noted that some of each kind of data is on the wrong side. In the example shown in FIG. 3, there are two portions of right-side data that are on the left and two portions of left-side data that are on the right. Notably, there is more misplaced right-side data than there is misplaced left side data.

Figure 4:
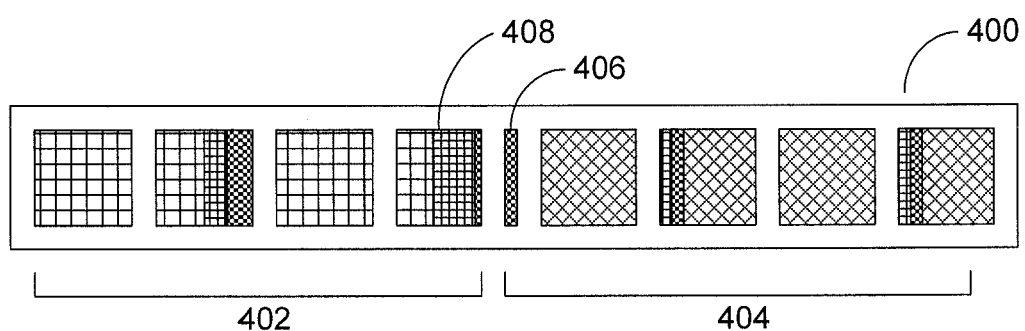
FIG. 4 is a diagram of a set of sorted partitions with misplaced elements where a dividing line between left and right has been moved.

Referring now to FIG. 4, the sides of the dataset 400 are adjusted to produce an adjusted left side 402 and an adjusted right side 404. To accomplish this, the line between sides is moved, such that a portion of the freshly sorted data reallocated from one side to the other, based on a balance between data that is supposed to be on the left vs. the right. This is performed by adjusting the cutline between sides and flipping a "marker" for the data in question to indicate whether a particular region is on the correct side or not. In view of the imbalance between misplaced left-side data and misplaced right-side data, the right side 404 is increased and the left side 402 is decreased, moving a portion of the misplaced data 406 to the right side 404 and leaving a remainder of a partition 408 on the left side 402. It should be noted that no data is actually moved, but rather the conceptual cutline between sides is changed.

Figure 5:
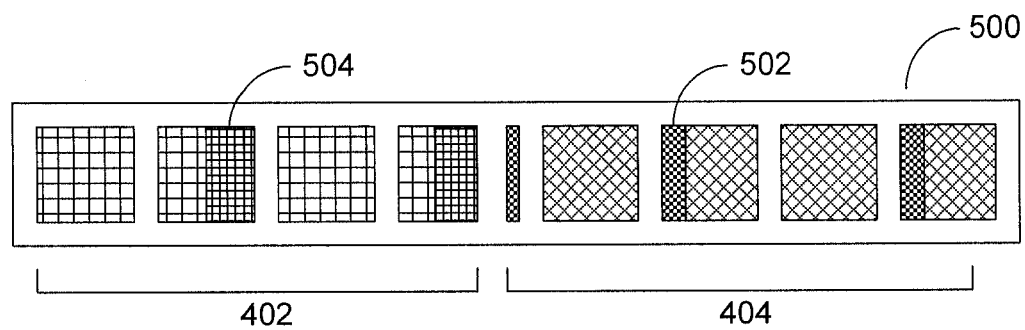
FIG. 5 is diagram of a set of sorted partitions where misplaced elements from each side of the dividing line have been swapped.

Referring now to FIG. 5, the misplaced data is swapped. Because moving the boundary between left side 402 and right side 404 created an even number of misplaced elements on each side, this is a simple in-place swap between elements, leaving only left-side data 504 on the left side and right-side data 502 on the right side. This swap can furthermore be performed in parallel, with each thread independently handling an equal number of the misplaced elements. Because the only concern in quicksort is to move elements to the correct side of the pivot, it does not matter what order the elements are swapped in.

After performing the swap of FIG. 5, with each side having only those elements that belong in it, the process can be performed again on each of the sides, with a number of threads being assigned to each side in rough proportion to the number elements on each side. For example, if the data set 500 included four hundred elements, with three hundred being on the right side 404 and one hundred being on the left side 402, then the next quicksort step may be performed with three threads handling the data of the right side 404 and one thread handling the data of the left side 402. Each side selects a new pivot for the next quicksort. Processing repeats in this fashion, sorting the progressively smaller partitions until the entire dataset 500 is sorted.

Figure 6:
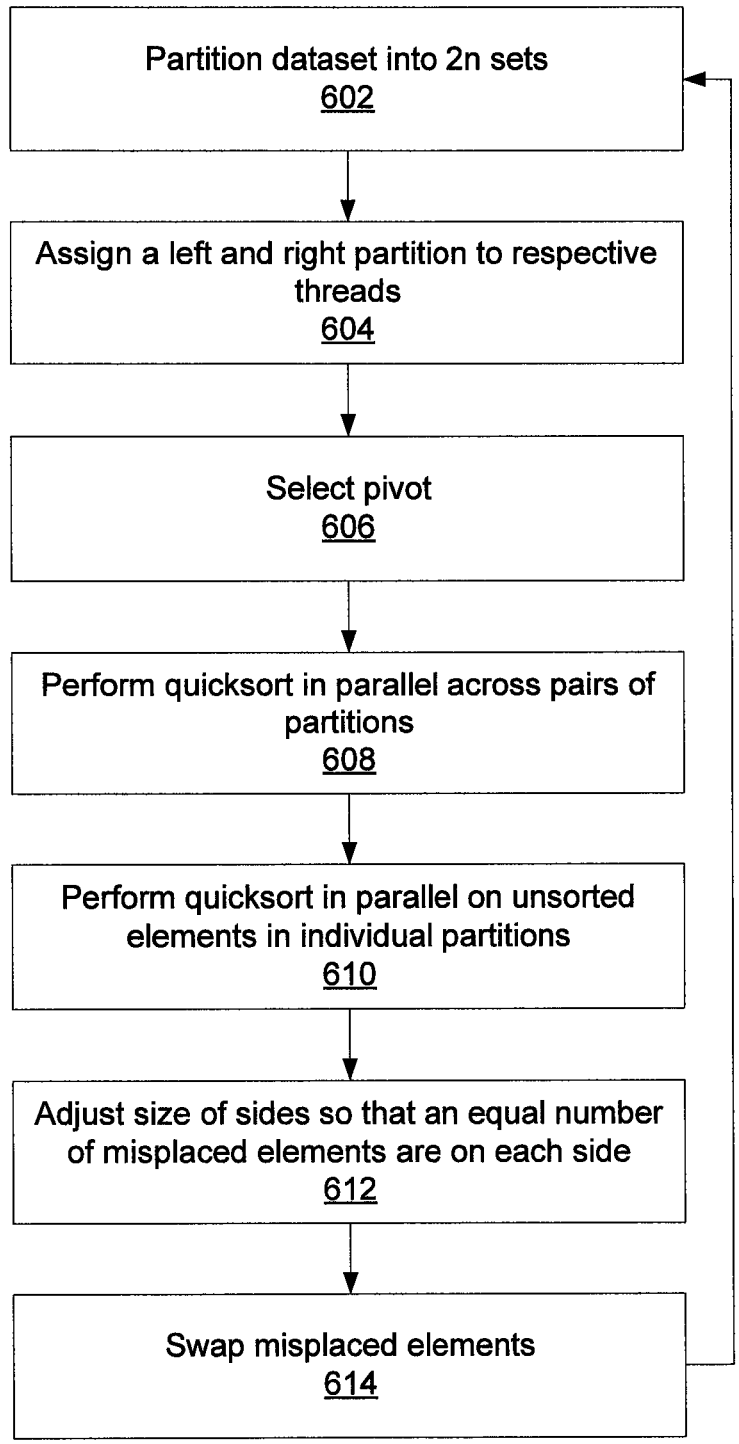
FIG. 6 is a block/flow diagram of a method of performing a parallel quicksort in accordance with the present principles.

Referring now to FIG. 6, a method of performing a parallel quicksort is shown. Block 602 partitions a dataset 100 into 2n partitions 102, where n is a number of parallel threads available. Block 604 divides the 2n partitions 102 into n pairs having a left-side partition and a right-side partition and assigns each pair to a respective thread. Block 606 selects a pivot by any appropriate means.

Block 608 performs a parallel quicksort of the pairs of partitions, with elements of each pair being swapped if they are on the wrong side of the pivot. In other words, if an element is higher than the pivot but is on the "left" partition in the pair, it is swapped with an element that is lower than the pivot but is on the "right" partition in the pair. Because the pivot is unlikely to be the true median for a pair of partitions, it is therefore likely that some elements will be left unsorted after the quicksort of block 608.

Block 610 performs a quicksort within each partition having unsorted elements remaining. This is also performed in parallel, with each such partition being sorted independently to identify elements 302 that are correctly placed (i.e., those elements which happen to be on the correct side of the pivot) and those elements 304 that are misplaced (i.e., which are on the wrong side of the pivot. Block 612 determines how many misplaced elements are on each side and adjusts the sides such that there are an equal number of misplaced elements on each. This may be accomplished by taking the difference between misplaced elements on the left side and misplaced elements on the right side, dividing that difference by two, and moving the resulting number of misplaced elements to the correct side, thereby increasing the number of elements on one side and decreasing the number of elements on the other.

Block 614 then swaps the misplaced elements on each side. The result is two sets of different size (unless the pivot happened to be the exact median of the total set), with one set including only elements below the pivot and the other set including only elements above the pivot. The pivot itself may be added to either set. Processing returns to block 602, with each of the resulting sets being partitioned as described above and having a number of threads to use in proportion to the fraction of the total number of elements that they include.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 7:
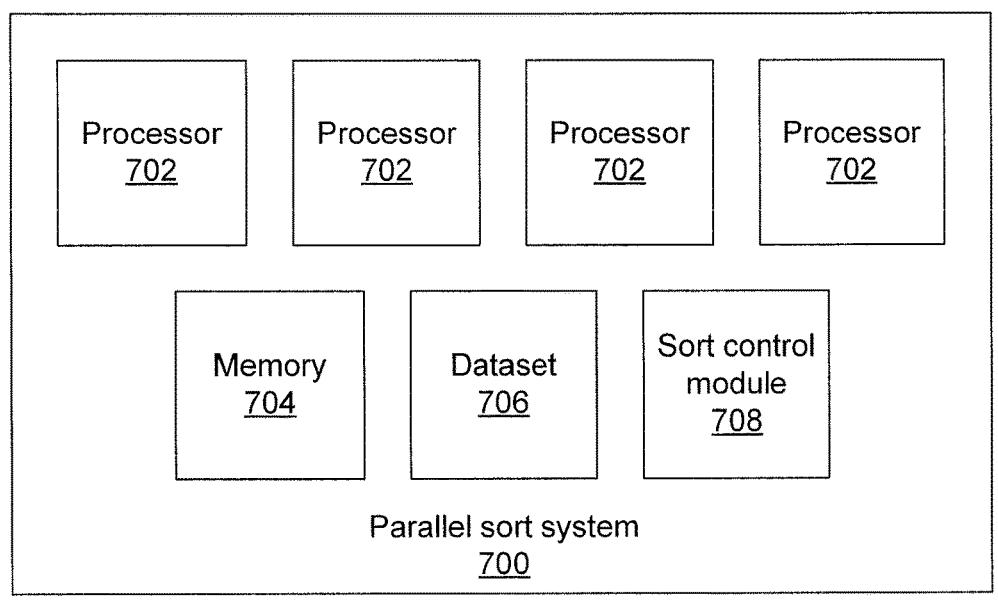
FIG. 7 is a block diagram of a system for performing a parallel quicksort in accordance with the present principles.

Referring now to FIG. 7, a system 700 for performing a parallel quicksort is shown. The system 700 includes multiple processors 702. These processors 702 may be distinct physical processor components, they may be different cores within a processor, or they may represent different devices entirely communicating in a distributed fashion with a central controller via a network. It should also be understood that, while four processors 702 are shown and discussed herein, any number of processors 702 may be used. A memory 704 stores a dataset 706. The quicksort is performed as described above, with only a minimal amount of memory 704 needed in addition to the dataset 706 to help perform in-place element swaps. The quicksort is managed by sort control module 708, which assigns partitions to the processors 702, selects the pivot, moves the boundary between sides, and manages the swapping of data. It should be recognized that the sort control module may be implemented as a discreet hardware device or component, with its own processor and memory, or it may be implemented by using the resources of a processor 702 and memory 704.

By introducing a parallel quicksort, embodiments of the present invention greatly speed the sorts that may be performed by parallel computing systems, thus providing an improvement to those systems at their most basic level. Increasing the speed of the sort by performing a parallel quicksort provides an improvement to nearly all parallel computing operations. For example, parallel computing solutions use sorting to help aggregate the outputs of multiple processes. As such, the present embodiments provide distinct improvements to the computing solutions themselves.

Having described preferred embodiments of a parallel quicksort (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for parallelizing a process of sorting a dataset to accelerate the process of sorting the dataset, comprising:
   partitioning the dataset into 2n partitions, where n is a number of available processors;
   assigning pairs of the partitions to respective ones of the available processors, wherein a given one of the pairs of the partitions includes a first partition corresponding to a first side of the dataset and a second partition corresponding to a second side of the dataset;
   performing a first quicksort in parallel across the pairs of partitions based on a pivot using the available processors, including swapping elements of the first partition larger than the pivot with elements of the second partition that are smaller than the pivot;
   performing a second quicksort in parallel across those partitions having unsorted elements based on the pivot, wherein the unsorted elements are those elements that were left unsorted by the first quicksort;
   adjusting the first and second sides of the dataset so that a number of first misplaced elements of the first side of the dataset is equal to a number of second misplaced element of the second side of the dataset; and
   swapping the first misplaced elements from the first side of the dataset with the second misplaced elements from the second side of the dataset to produce a first dataset that has elements equal to or lower than the pivot and a second dataset that has elements equal to or higher than the pivot.

2. The method of claim 1, wherein the first quicksort performed on the given pair of partitions is halted when one partition of the given pair of partitions has been fully sorted.

3. The method of claim 1, further comprising recursively repeating said steps of partitioning, performing a first quicksort, performing a second quicksort, and swapping on each of the first and second datasets.

4. The method of claim 3, wherein the pairs partitions are assigned to the available processors in proportion to a number of data elements they include.

5. The method of claim 1, wherein adjusting the first and second sides of the dataset further comprises changing a cutline between the first and second sides of the dataset without moving any data elements.

6. The method of claim 1, wherein said steps of partitioning, performing the first quicksort, performing the second quicksort, and swapping misplaced elements are performed as part of an aggregate function in a parallel computing system.

7. The method of claim 1, wherein adjusting the first and second sides of the dataset further comprises taking a difference between the first misplaced elements and the second misplaced elements, dividing the difference by two, and moving a number of misplaced elements resulting from the division to one of the first and second sides so that the number of first misplaced elements is equal to the number of second misplaced elements.

8. A computer readable storage medium comprising a computer readable program, wherein the computer readable program when executed on a computer causes the computer to perform a method for parallelizing a process of sorting a dataset to accelerate the process of sorting the dataset, the od comprising the steps of:
   partitioning the dataset into 2n partitions, where n is a number of available processors;
   assigning pairs of the partitions to respective ones of the available processors, wherein a given one of the pairs of the partitions includes a first partition corresponding to a first side of the dataset and a second partition corresponding to a second side of the dataset;
   performing a first quicksort in parallel across the pairs of partitions based on a pivot using the available processors, including swapping elements of the first partition larger than the pivot with elements of the second partition that are smaller than the pivot;
   performing a second quicksort in parallel across those partitions having unsorted elements based on the pivot, wherein the unsorted elements are those elements that were left unsorted by the first quicksort;
   adjusting the first and second sides of the dataset so that a number of first misplaced elements of the first side of the dataset is equal to a number of second misplaced elements of the second side of the dataset; and
   swapping the first misplaced elements from the first side of the dataset with the second misplaced elements from the second side of the dataset to produce a first dataset that has elements equal to or lower than the pivot and a second dataset that has elements equal to or higher than the pivot.

9. The computer program product of claim 8, wherein the first quicksort performed on the given pair of partitions is halted when one partition of the given pair of partitions has been fully sorted.

10. The computer program product of claim 8, further comprising recursively repeating said steps of partitioning, performing a first quicksort, performing a second quicksort, and swapping on each of the first and second datasets.

11. The computer program product of claim 8, wherein the pairs of partitions are assigned to the available processors in proportion to a number of data elements they include.

12. The computer program product of claim 8, wherein adjusting the first and second sides of the dataset further comprises changing a cutline between the first and second sides without moving any data elements.

13. The computer program product of claim 8, wherein said steps of partitioning, performing the first quicksort, performing the second quicksort, and swapping misplaced elements are performed as part of an aggregate function in a parallel computing system.

14. A system for parallelizing a process of sorting a dataset to accelerating the process of sorting the dataset, comprising:
 a plurality of processors operatively coupled to a memory storing the dataset; and
 a sort control module configured to partition the dataset into 2n partitions, where n is a number of available processors, to assign pairs of the partitions to respective ones of the available processors, wherein a given one of the pairs of the partitions includes a first partition corresponding to a first side of the dataset and a second partition corresponding to a second side of the dataset, to trigger a performance of a first quicksort in parallel across the pairs of partitions based on a pivot, including swapping elements of the first partition larger than the pivot with elements of the second partition that are smaller than the pivot, to trigger a performance of a second quicksort in parallel across those partitions having unsorted elements based on the pivot, wherein the unsorted elements are those elements that were left unsorted by the first quicksort, to adjust the first and second sides of the dataset so that a number of first misplaced elements of the first side of the dataset is equal to a number of second misplaced elements of the second side of the dataset, and to trigger a swap of the first misplaced elements from the first side of the dataset with the second misplaced elements from the second side of the dataset to produce a first dataset that has elements equal to or lower than the pivot and a second dataset that has elements equal to or higher than the pivot.

15. The system of claim 14, wherein the first quicksort performed on the given pair of partitions is halted when one partition of the given pair of partitions has been fully sorted.

16. The system of claim 14, wherein the sort control module is further configured to recursively repeat the partitioning, the triggering of the first quicksort, the triggering of the second quicksort, and the triggering of the swap on each of the first and second datasets.

17. The system of claim 14, wherein the sort control module is further configured to assign the pairs of partitions to the available processors in proportion to a number of data elements the pairs of partitions include.

18. The system of claim 14, wherein, in adjusting the first and second sides of the dataset, the sort module is further configured to change a cutline between the first and second sides of the dataset without moving any data elements.

19. The system of claim 14, wherein the sort control module is further configured to partition, trigger the first quicksort, trigger the second quicksort, and trigger the swap on each of the first and second datasets as part of an aggregate function in a parallel computing system.

20. The system of claim 14, wherein, in adjusting the first and second sides of the dataset, the sorting sort control module is further configured to take a difference between the first misplaced elements and the second misplaced elements, divide the difference by two, and move a number of misplaced elements resulting from the division to one of the first and second sides so that the number of first misplaced elements is equal to the number of second misplaced elements.

\* \* \* \* \*